(12) United States Patent
Phanco

(10) Patent No.: US 10,823,317 B1
(45) Date of Patent: Nov. 3, 2020

(54) SWIVEL FITTING ADAPTOR AND ASSEMBLY

(71) Applicant: Hydro-Gear Limited Partnership, Sullivan, IL (US)

(72) Inventor: Eric S. Phanco, Plainfield, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 206 days.

(21) Appl. No.: 15/724,772

(22) Filed: Oct. 4, 2017

Related U.S. Application Data

(60) Provisional application No. 62/409,503, filed on Oct. 18, 2016.

(51) Int. Cl.
*F16L 27/08* (2006.01)

(52) U.S. Cl.
CPC ................................ *F16L 27/0804* (2013.01)

(58) Field of Classification Search
CPC ... F16L 27/0804; F16L 27/08; F16L 27/0808; F16L 27/0837; F16L 27/0845; F16L 27/0849; F16L 27/0861; F16L 37/025; F16L 37/10; F16L 37/101; F16L 37/50; F16L 37/53
USPC ......... 285/275, 148.11, 148.13, 148.15, 345, 285/351, 347, 346, 332.2
See application file for complete search history.

(56) References Cited

U.S. PATENT DOCUMENTS

| | | | |
|---|---|---|---|
| 341,444 A | 5/1886 | Bray | |
| 470,531 A | 3/1892 | Aims, Jr. | |
| 1,461,385 A * | 7/1923 | Falor | F16L 37/025 285/141.1 |
| 2,314,315 A | 3/1943 | Scheele | |
| 2,343,774 A | 3/1944 | Klein | |
| 2,429,782 A * | 10/1947 | Versoy | F16L 37/025 285/304 |
| 2,446,327 A * | 8/1948 | Heinrich | F16L 27/0804 285/181 |
| 2,670,976 A | 3/1954 | Owen | |
| 2,702,200 A * | 2/1955 | Fukuyama | F16L 27/082 285/110 |
| 2,812,958 A * | 11/1957 | Rogers | F16L 37/084 285/18 |
| 2,897,533 A | 8/1959 | Bull et al. | |
| 3,112,939 A * | 12/1963 | Graham | F16L 37/025 285/238 |

(Continued)

FOREIGN PATENT DOCUMENTS

| EP | 1370793 | 8/2006 |
|---|---|---|
| WO | WO2002029300 | 4/2002 |

OTHER PUBLICATIONS

U.S. Appl. No. 15/724,956, filed Oct. 4, 2017, 17 pp.

*Primary Examiner* — Aaron M Dunwoody
(74) *Attorney, Agent, or Firm* — Neal, Gerber & Eisenberg LLP

(57) ABSTRACT

A swivel fitting adaptor having an elastomeric insert, and a swivel fitting assembly using the adaptor and insert, are disclosed herein. The swivel fitting assembly includes retention and sealing features that allow a barbed fitting, such as a tube, hose or vent fitting, to be installed by hand either before or after the adaptor and insert are installed in a threaded port. It is suitable for use in a variety of low to medium pressure fluid passage and venting applications.

20 Claims, 5 Drawing Sheets

(56) References Cited

U.S. PATENT DOCUMENTS

| | | | | |
|---|---|---|---|---|
| 3,278,204 A * | 10/1966 | Currie | F16L 27/0861 | |
| | | | 285/281 | |
| 3,422,864 A * | 1/1969 | Allinquant | E21D 15/512 | |
| | | | 137/614 | |
| 3,677,578 A | 7/1972 | Roos | | |
| 3,879,069 A | 4/1975 | Oostenbrink | | |
| 3,913,928 A | 10/1975 | Yamaguchi | | |
| 4,232,421 A | 11/1980 | Tucker | | |
| 4,580,816 A * | 4/1986 | Campbell | A61M 39/00 | |
| | | | 285/321 | |
| 4,589,688 A * | 5/1986 | Johnson | E03C 1/0403 | |
| | | | 285/12 | |
| 5,104,151 A | 4/1992 | Adams | | |
| 5,131,408 A | 7/1992 | Smith | | |
| 5,474,337 A | 12/1995 | Nepsund et al. | | |
| 5,616,203 A * | 4/1997 | Stevens | A61M 25/0014 | |
| | | | 156/273.7 | |
| 5,692,858 A | 12/1997 | Vaughan | | |
| 5,881,840 A | 3/1999 | Mize | | |
| 5,927,761 A | 7/1999 | Bartholomew | | |
| 6,273,478 B1 * | 8/2001 | Benett | F15C 5/00 | |
| | | | 285/338 | |
| 6,557,825 B2 | 5/2003 | Stone et al. | | |
| 6,808,181 B1 | 10/2004 | Shemtov | | |
| 6,854,771 B1 * | 2/2005 | Olson | F16L 37/088 | |
| | | | 251/145 | |
| 6,883,538 B2 | 4/2005 | Toyokawa et al. | | |
| 7,118,138 B1 | 10/2006 | Rowley et al. | | |
| 7,550,689 B2 | 6/2009 | Wech et al. | | |
| 7,681,927 B2 * | 3/2010 | Olson | F16L 37/08 | |
| | | | 285/353 | |
| 7,837,646 B2 * | 11/2010 | Eidinger | A61M 25/0009 | |
| | | | 285/319 | |
| 7,918,486 B2 | 4/2011 | Preisendorfer | | |
| 7,988,203 B2 | 8/2011 | Martin | | |
| 8,020,896 B2 | 9/2011 | Ehrmann | | |
| 8,096,587 B2 | 1/2012 | Romero et al. | | |
| 8,336,495 B1 | 12/2012 | Dumm | | |
| 8,448,827 B2 | 5/2013 | Doelman et al. | | |
| 8,490,577 B1 | 7/2013 | Dumm | | |
| 9,592,373 B2 * | 3/2017 | Nguyen | A61M 39/10 | |
| 2004/0261748 A1 | 12/2004 | Lafleur | | |
| 2009/0226250 A1 * | 9/2009 | Cambot Courrau | F16L 27/0812 | |
| | | | 403/408.1 | |
| 2013/0171869 A1 | 7/2013 | Chastain et al. | | |
| 2015/0376993 A1 * | 12/2015 | Vass | E21B 43/116 | |
| | | | 175/4.56 | |
| 2016/0003396 A1 * | 1/2016 | Taguchi | F16L 37/407 | |
| | | | 285/119 | |
| 2017/0205005 A1 * | 7/2017 | Steele | F16L 27/0845 | |

* cited by examiner

SWIVEL FITTING ADAPTOR AND ASSEMBLY

CROSS-REFERENCE TO RELATED APPLICATIONS

This application claims priority to U.S. Provisional Patent Application Ser. No. 62/409,503, filed on Oct. 18, 2016, the entire disclosure of which is incorporated by reference herein.

BACKGROUND OF THE INVENTION

This application relates to swivel fittings in general, and in particular to swivel fittings suitable for use in low to medium pressure fluid transfer and venting applications, such use including attachment of a tube to a hydrostatic drive unit of a vehicle or other powered equipment. Such a tube may be connected to an external tank or vent fitting.

Various mechanisms exist to adapt a fitting to a threaded port. Some of the mechanisms have swivel capability once installed. One such design uses a jam nut of the fitting to tighten a sealing plate against the port. The jam nut design allows an installer to rotate the fitting to a specific angle before tightening the jam nut. This known design is relatively expensive in comparison to the disclosed invention that provides a lower cost alternative swivel fitting that can be quickly and easily installed and is suitable for a variety of applications.

SUMMARY OF THE INVENTION

A swivel fitting assembly comprising a specialized adaptor assembly that receives and retains a conventional barbed fitting is disclosed herein. The adaptor assembly and barbed fitting can be easily installed in a threaded port (such as an SAE J1926/1 port, for example) and the resultant swivel fitting can then be pivoted to align with a tube or hose. An elastomeric material (such as nitrile butadiene rubber or "NBR," for example) can be selected for a tubular insert of the fitting to determine strength, pressure rating and chemical resistance properties of the fitting for a particular application, thus providing versatility and cost control.

It should be noted that the principles taught herein can be applied to various types of fittings, such as vent fittings, for example, and not just the illustrated tube or hose fitting.

A better understanding of the properties of the invention will be obtained from the following detailed description and accompanying drawings which set forth an illustrative embodiment that is indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the inventions to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

Figure 1:
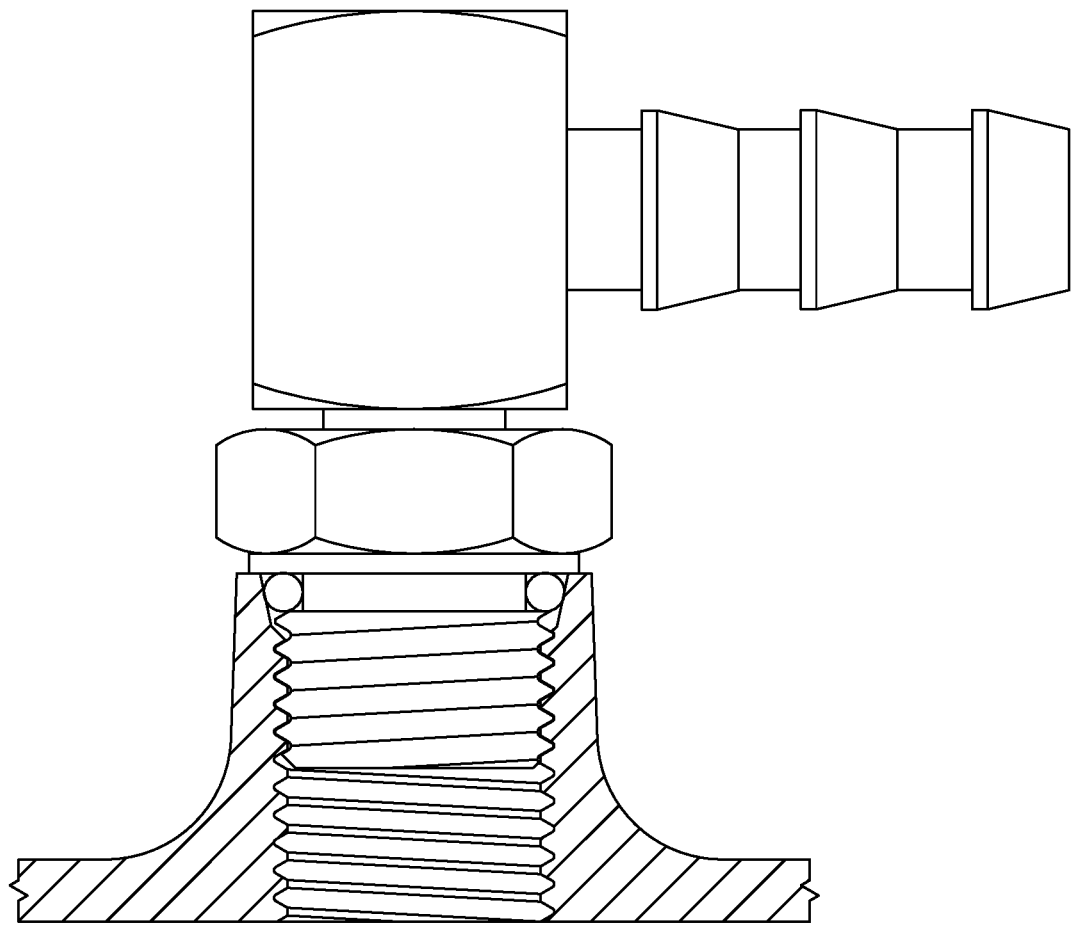
FIG. 1 is prior art depicting a swivel fitting with jam nut for an SAE port.
Figure 2:
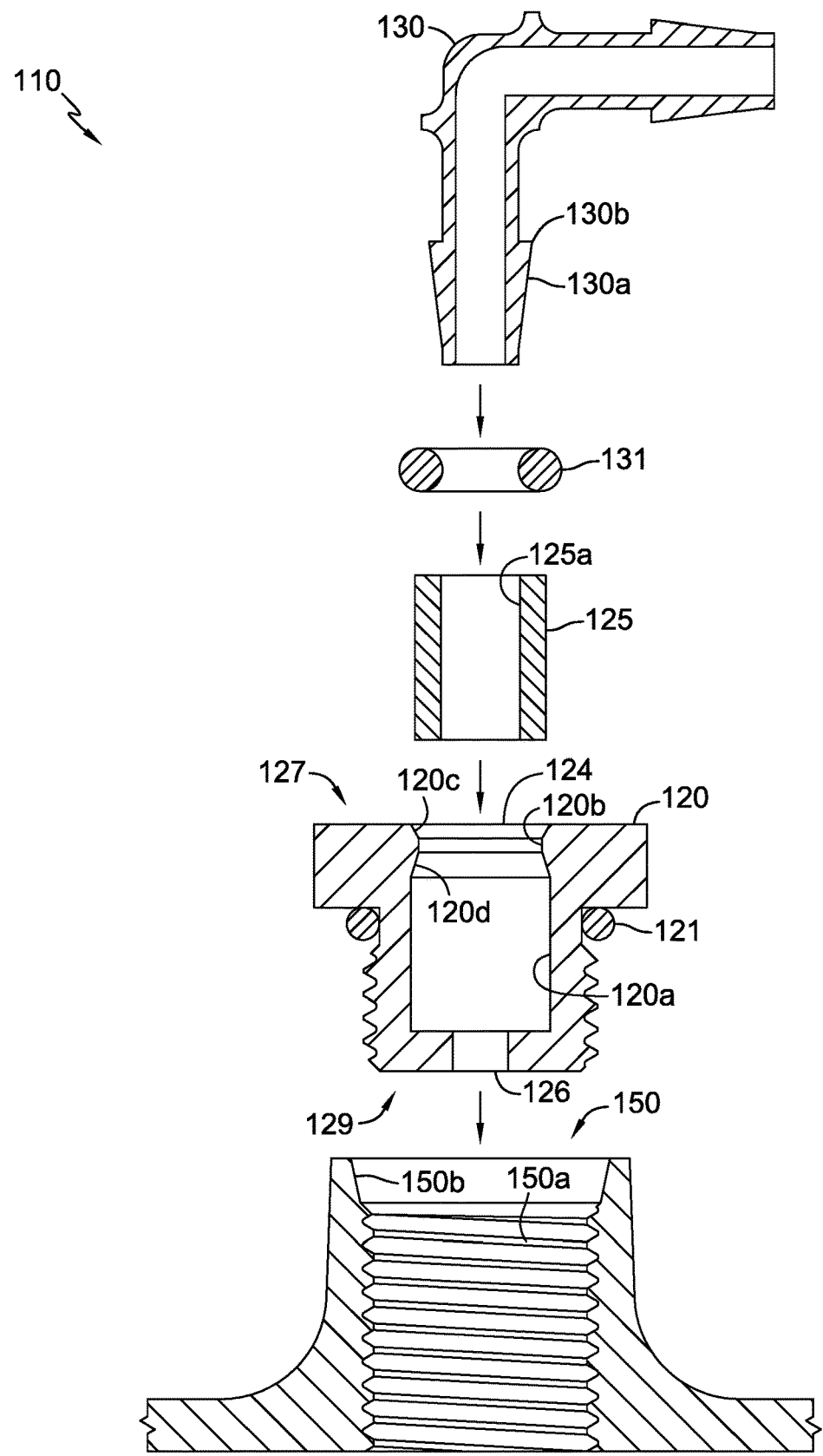
FIG. 2 is a cross-sectional, exploded view of the swivel fitting assembly disclosed herein.
Figure 3:
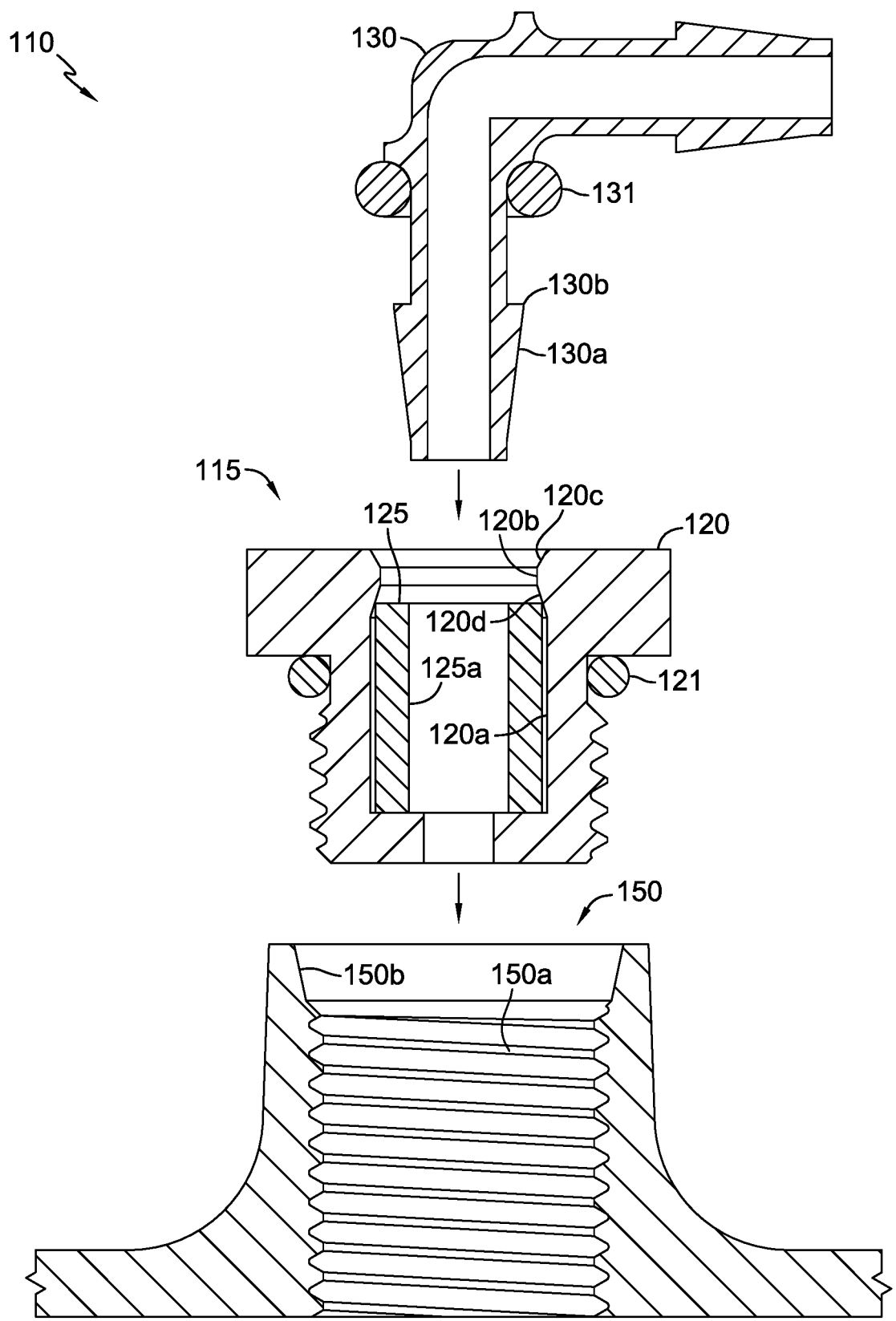
FIG. 3 is a cross-sectional, partially assembled view of the swivel fitting assembly of FIG. 2.
Figure 4:
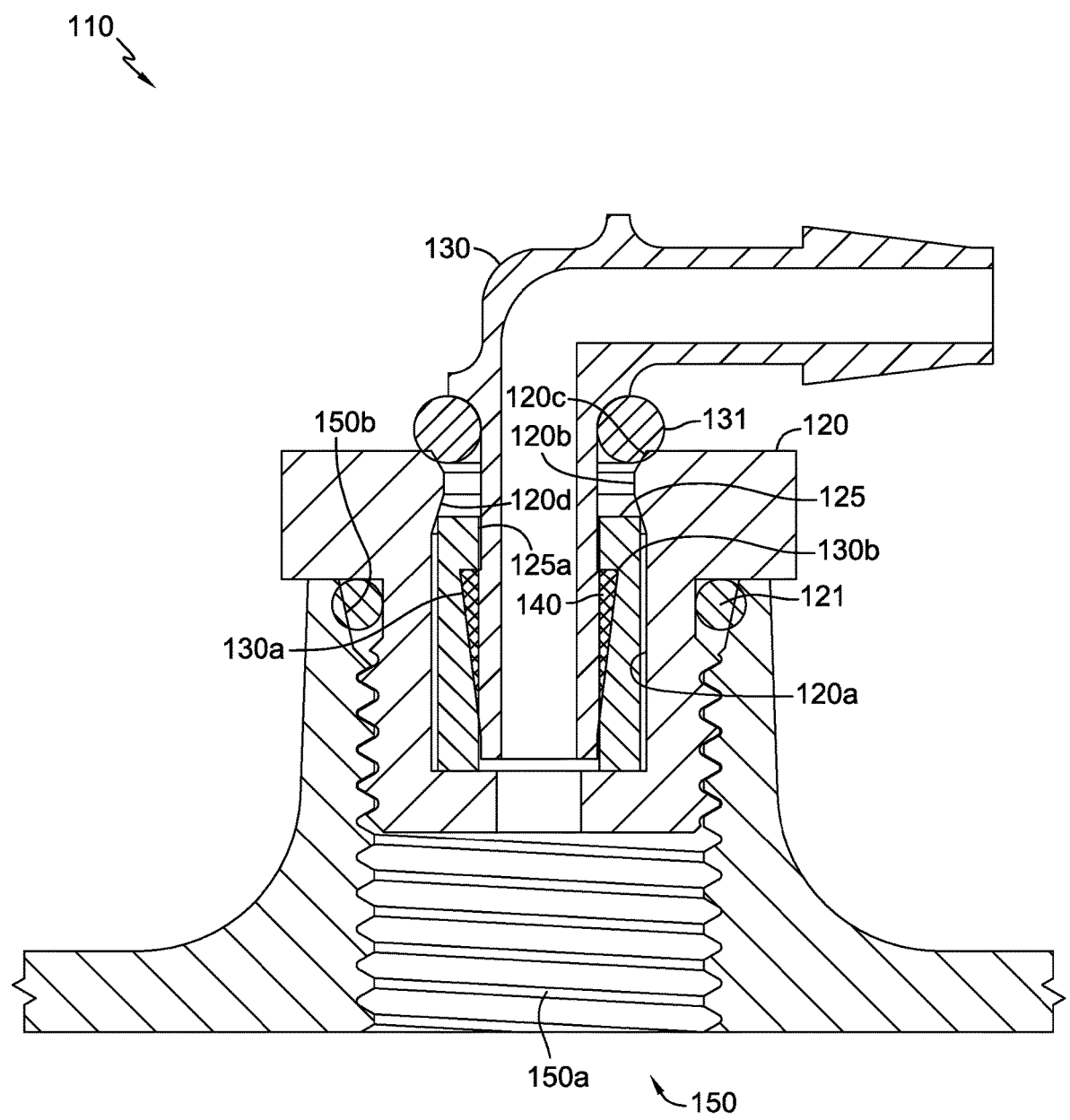
FIG. 4 is a cross-sectional view of the assembled swivel fitting of FIG. 2, illustrating the interference fit between certain components of the swivel fitting.
Figure 5:
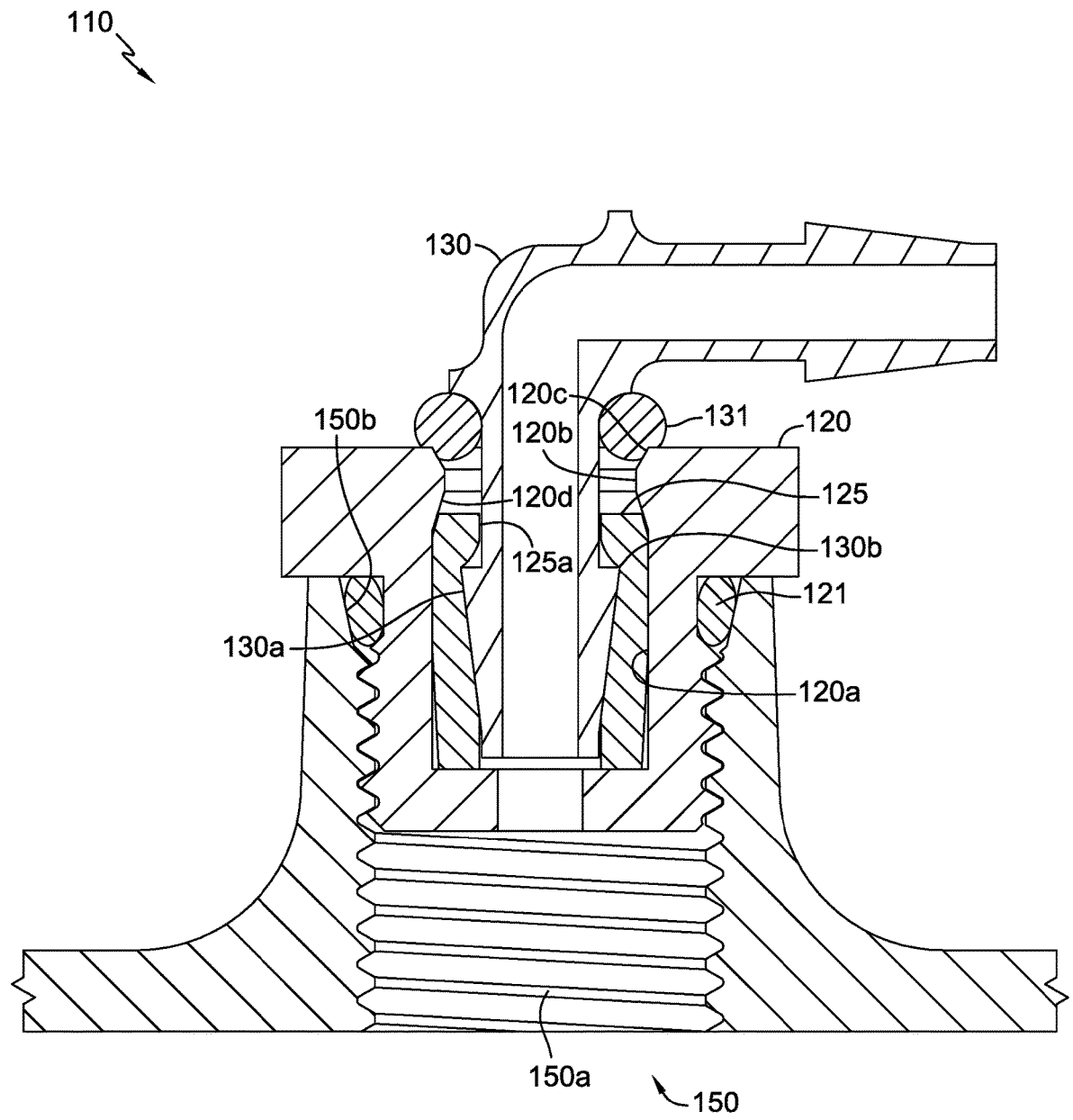
FIG. 5 is a cross-sectional view of the assembled swivel fitting of FIG. 2 illustrating deflection of an elastomeric insert.

FIG. 1 depicts a conventional tube fitting with a jam nut and FIGS. 2-5 illustrate an embodiment of the disclosed invention in the form of a swivel fitting assembly 110 that is installed in a threaded port 150 comprising thread 150a and chamfer 150b. The components of swivel fitting assembly 110 are shown most clearly in FIG. 2. A specialized adaptor 120 with O-ring 121 is illustrated as a modified or customized SAE J514 straight thread fitting. An internal chamber 120a is formed in solid body adaptor 120 between a first opening 124 formed at proximal end 127 and a second opening 126 formed in distal end 129. A transition fit (preferably a slight interference fit for retention) allows a tubular elastomeric insert 125 to be easily pushed or slipped past a ring protuberance 120b and into place in internal chamber 120a, resulting in adaptor assembly 115 as shown in FIG. 3. The ring protuberance 120b is flanked by a first, or external, chamfer 120c and a second, or internal, chamfer 120d. The adaptor assembly 115 can be installed in threaded port 150 either before or after the barbed fitting 130 and O-ring 131 are assembled with adaptor assembly 115. Adaptor assembly 115 is sealed in port 150 via interface of O-ring 121 with chamfer 150b.

When barbed fitting 130 is inserted into elastomeric insert 125, a conical barb 130a of the barbed fitting 130 bears against inner wall 125a to create a radial compression zone, thereby forcing the elastomeric insert 125 into sealing contact with internal chamber 120a and the internal chamfer 120d. A typically sharp rim 130b formed at the base of the conical barb 130a ensures a tight joint that resists pullout of barbed fitting 130 from insert 125 and adaptor 120.

The diameter of ring protuberance 120b is large enough to allow easy installation of the insert 125 but small enough to make disassembly of swivel fitting assembly 110 difficult. When an attempt is made to pull out the barbed fitting 130, rim 130b bites into the elastomeric material of insert 125 and tries to pull insert 125 out of adaptor 120 along with barbed fitting 130. However, the diameter of the ring protuberance 120b is sized small enough to make pullout of these two components together either difficult or impossible without destruction of the locking interface. The angle of the internal chamfer 120d and the diameter of the ring protuberance 120b can be adjusted to make the joint with barbed fitting 130 either serviceable or permanent. The material interference fit 140 of conical barb 130a with insert 125 is represented as a crosshatched area in FIG. 4.

When the barbed fitting 130 is fully inserted into adaptor assembly 115, the O-ring 131 (pre-installed on the barbed fitting 130) will contact the external chamfer 120c of adaptor 120. This provides some stiffness to the joint to resist tilting the barbed end 130a relative to adaptor assembly 115. The height of the tubular insert 125 is sized to contact the internal chamfer 120d to bias the barbed fitting 130 downward into internal chamber 120*a* due to the compression of the tubular insert 125 while the external chamfer 120*c* creates a bias to push the barbed fitting upward due to the compression of the O-ring 131. These two opposing compressions help to stiffen the joint and increase the sealing capacity. The O-ring 131 also serves as a back-up seal for the main radial compression seal of tubular insert 125 and seals against any foreign matter getting into adaptor 120 below the O-ring 131. Once installed, the barbed fitting 130 can be swiveled to align while remaining sealed and resisting pullout.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A fitting assembly for allowing fluid transfer or venting from a port, the fitting assembly comprising:
    a threaded adaptor comprising:
        a first opening formed in a proximal end and having a first chamfer;
        a second opening formed in a distal end;
        an internal chamber disposed between the proximal end and the distal end; and
        a ring protuberance formed on an internal surface of the internal chamber, wherein the ring protuberance is flanked by the first chamfer and a second chamfer, and the second chamfer is positioned between the internal chamber and the ring protuberance;
    an elastomeric tubular insert positioned within the internal chamber; and
    a fitting inserted through the first opening, the fitting comprising a conical barb, wherein the conical barb exerts pressure against the elastomeric tubular insert and the second chamfer to create a first radial seal, and the ring protuberance inhibits pullout of the fitting and the elastomeric tubular insert from the adaptor.

2. The fitting assembly of claim 1, further comprising a first O-ring positioned between an external structure of the fitting and the first chamfer to create a second radial seal.

3. The fitting assembly of claim 2, wherein the elastomeric tubular insert is compressed against the second chamfer to bias the fitting in a first direction and the first O-ring is compressed against the first chamfer to bias the fitting in a second, opposite direction.

4. The fitting assembly of claim 3, further comprising a second O-ring configured to be positioned between the adaptor and the port.

5. The fitting assembly of claim 4, wherein the second O-ring is compressed when the adaptor is threaded into the port to create a radial seal between the adaptor and the port.

6. The fitting assembly of claim 5, wherein the conical barb exerts pressure against the elastomeric tubular insert and the second chamfer via a sharp rim.

7. The fitting assembly of claim 1, wherein the conical barb exerts pressure against the elastomeric tubular insert and the second chamfer via a sharp rim.

8. A fitting assembly for use with a port, the fitting assembly comprising:
    a threaded adaptor comprising a threaded external surface, an internal chamber and a ring protuberance formed on and extending inwardly from an internal cylindrical surface of the internal chamber;
    a tubular elastomeric insert positionable in the internal chamber and having an inner cylindrical wall; and
    a fitting insertable into the adaptor and comprising a conical barb configured to compress the elastomeric insert against the adaptor such that the elastomeric insert abuts the internal cylindrical surface and interlocks with the ring protuberance to inhibit removal of the fitting from the adaptor, wherein the fitting deforms the inner cylindrical wall of the tubular elastomeric insert when the fitting is inserted into the adaptor.

9. The fitting assembly of claim 8, wherein the adaptor further comprises an external chamfer formed adjacent a first opening in the adaptor and an internal chamfer formed adjacent to the ring protuberance.

10. The fitting assembly of claim 9, further comprising a first O-ring positionable between an external surface of the fitting and the external chamfer to create a radial seal.

11. The fitting assembly of claim 10, wherein the elastomeric insert is compressed against the internal chamfer to bias the fitting in a first direction and the first O-ring is compressed against the external chamfer to bias the fitting in a second, opposite direction.

12. The fitting assembly of claim 11, wherein the conical barb compresses the elastomeric insert against the adaptor via a sharp rim.

13. The fitting assembly of claim 8, further comprising an O-ring configured to be compressed between the adaptor and the port.

14. The fitting assembly of claim 8, wherein the conical barb compresses the elastomeric insert against the adaptor via a sharp rim.

15. A fluid line connector comprising:
    a threaded adaptor comprising:
        an internal cylindrical surface defining an internal chamber, and
        a ring protuberance extending radially into the internal chamber;
    a tubular elastomeric insert positionable in the internal chamber to abut the internal cylindrical surface and having an inner cylindrical wall; and
    a fitting having a conical barb positionable in the elastomeric insert and configured to:
        expand the elastomeric insert against the ring protuberance to retain the fitting in the adaptor; and
        force the elastomeric insert into sealing engagement with the internal cylindrical surface,
    wherein the fitting deforms the inner cylindrical wall of the tubular elastomeric insert when the fitting is inserted into the adaptor.

16. The fluid line connector of claim 15, wherein the adaptor further comprises an internal chamfer and an opposing external chamfer, wherein the ring protuberance is disposed between the internal chamfer and the external chamfer.

17. The fluid line connector of claim 16, further comprising a first O-ring positionable between the fitting and the external chamfer to create a radial seal.

18. The fluid line connector of claim 17, wherein the tubular elastomeric insert is compressed against the internal chamfer to bias the fitting in a first direction and the first O-ring is compressed against the external chamfer to bias the fitting in an opposite second direction.

19. The fluid line connector of claim 15, further comprising an O-ring configured to be compressed between the adaptor and a port.

20. The fluid line connector of claim 15, wherein the conical barb compresses the tubular elastomeric insert against the adaptor via a sharp rim.

\* \* \* \* \*